May 1, 1956     C. F. TAYLOR     2,744,200
MULTIPLE MASKED PHOTOCELL STRUCTURE
Filed March 7, 1952     2 Sheets—Sheet 1
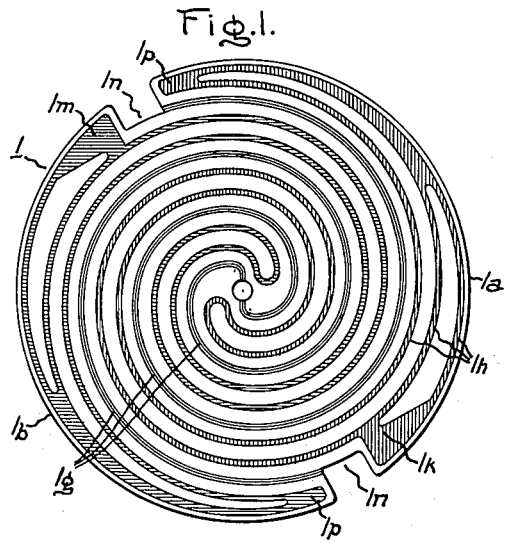
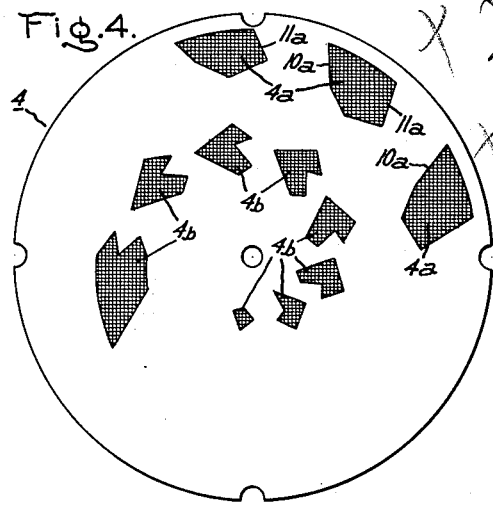
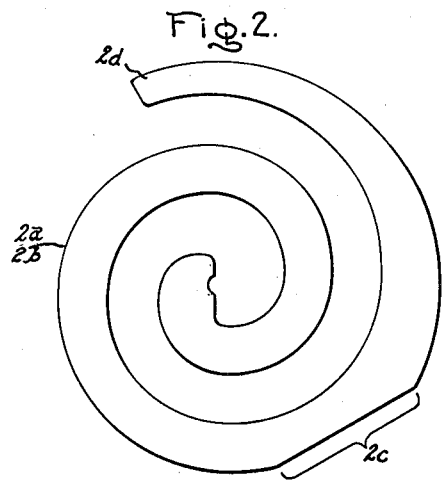
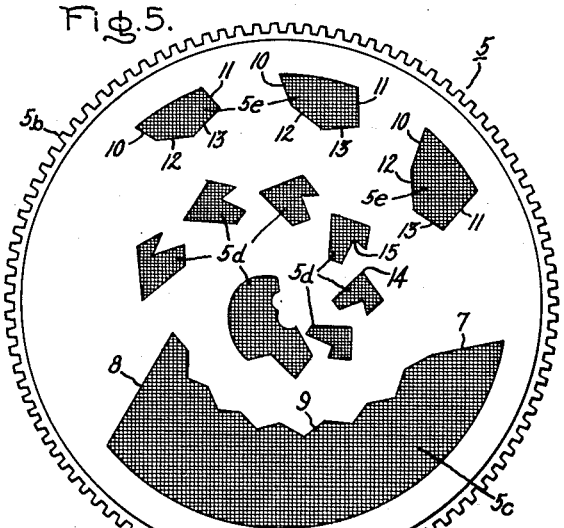
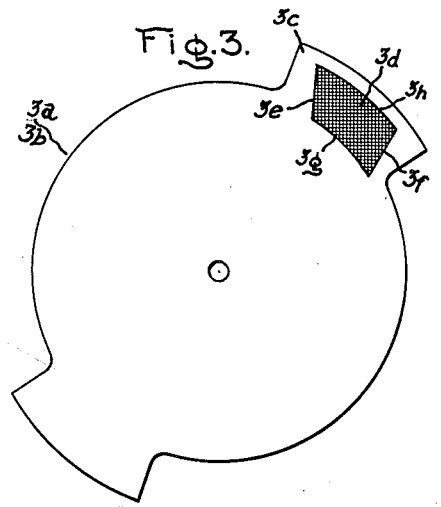
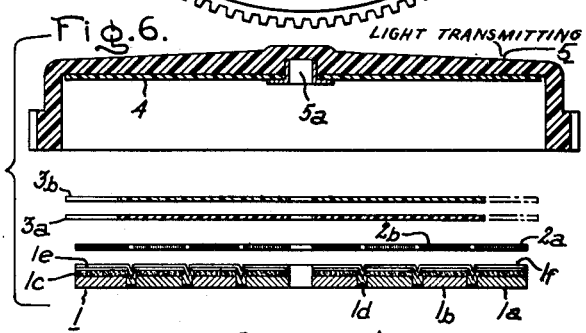
Inventor:
Clement F. Taylor,
by Richard E. Hosley
His Attorney.

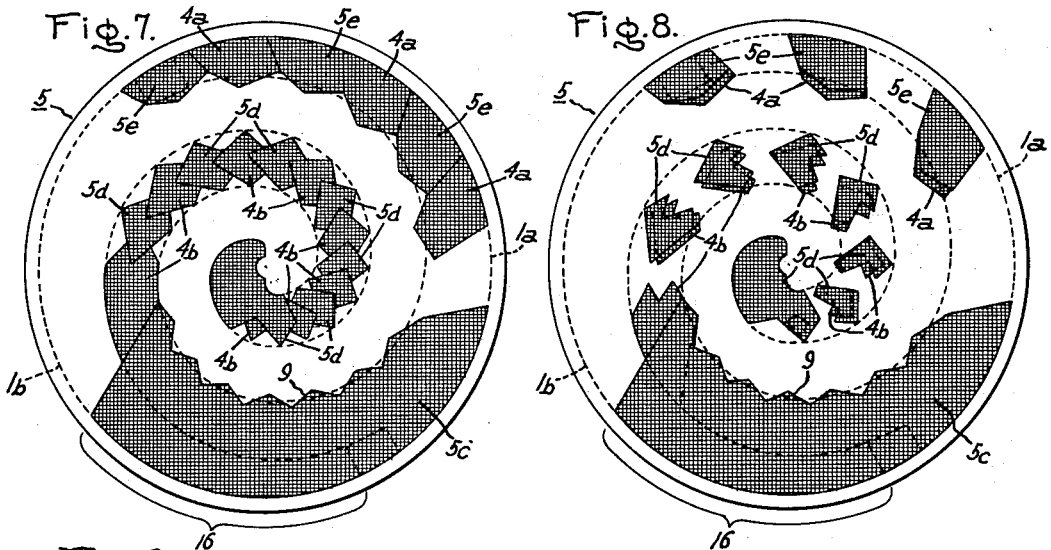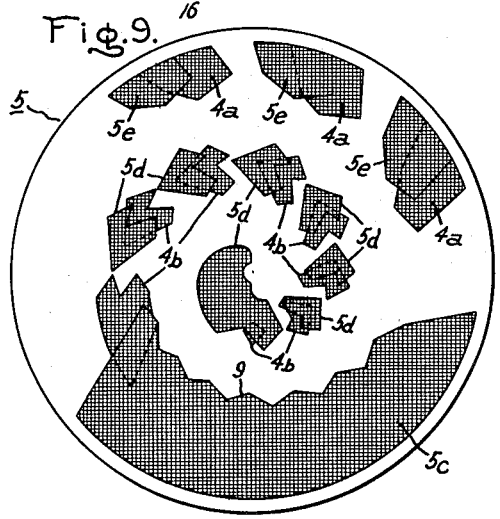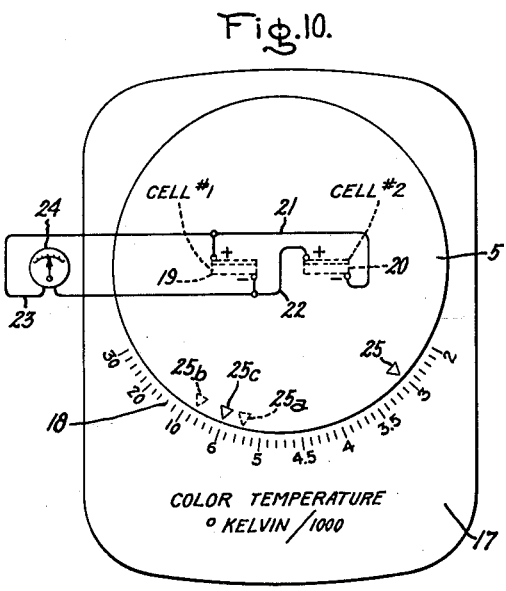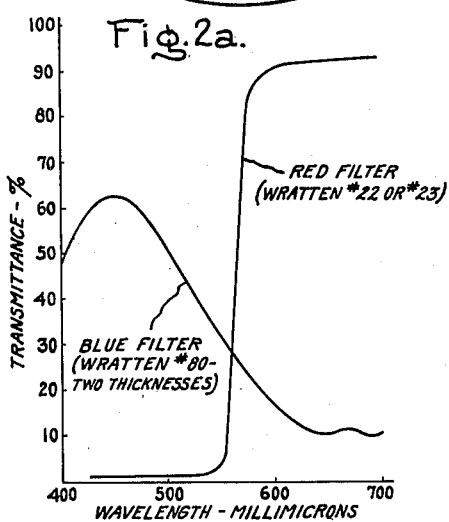

United States Patent Office 2,744,200
Patented May 1, 1956

2,744,200

MULTIPLE MASKED PHOTOCELL STRUCTURE

Clement F. Taylor, Lynn, Mass., assignor to General Electric Company, a corporation of New York Application March 7, 1952, Serial No. 275,414

11 Claims. (Cl. 250—220)

This invention relates to photoelectric cell structure, particularly to a multiple masking arrangement for calibrating the photocell in manufacture, and for adjustably masking portions of the cell structure to vary its output in normal operation.

This masked photocell structure is particularly intended for use in the "color control meter" described more particularly in the copending application of Allen G. Stimson, Clement F. Taylor and Hans A. Bakke, Serial Number 286,494, filed May 7, 1952, issued on December 27, 1955, as U. S. Patent No. 2,728,265, and assigned to the same assignee as the present application. This meter is characterized by a plurality of nested spiral photocells connected in series, with an indicating instrument arranged to measure the ratio between the intensity of components of the illumination in two widely spaced portions of the spectrum, this ratio being taken as a measure of the "equivalent color temperature" of the light. The meter is particularly intended for use by photographers exposing color film, in which process it is important that the color quality of the illumination match the characteristics of the film being used, or that, alternatively, a suitable corrective filter be used, either over the light source or over the camera lens, in order that the resulting color rendition by the film shall be as desired. In manufacturing such a meter on a large scale for sale to professional and amateur photographers, at prices within reach of both, it is essential that a preselected fixed scale be used on the meter, and that the instrument give an accurate indication of color temperature regardless of variations in the characteristics of individual photocells manufactured by mass production methods. It is also important to the user that the color meter be insensitive to non-uniformity of the light falling on it, particularly that resulting from change in the angle from which the illumination reaches the light sensitive cell.

Accordingly, an object of the present invention is to provide an improved adjustable masking arrangement for a multiple photocell unit whereby the characteristics of individual cells may be readily matched in the process of manufacture to a preselected indicator scale.

A further object is to provide a photocell masking arrangement of the type described in which the photocells produce an indication which is substantially independent of the angle at which the illumination falls on the sensitive surface of the cell.

Another object is to provide an improved photocell masking arrangement in which a large degree of movement of an adjustable masking element produces a comparatively small change in the masking effect, and in which the masking effect is a smoothly continuous function of the movement of the masking element.

Other objects and advantages will become apparent from the following description taken in connection with the accompanying drawings in which Fig. 1 is a plan view of the multiple photocell unit, Fig. 2 is a plan view of one of the two color filters which are secured over the respective photocells, Fig. 2a is a graphic representation of the light-transmitting characteristics of the two color filters employed, Fig. 3 is a plan view of one of two identical adjustable masks employed in the calibration of the photocells, Figs. 4 and 5 are plan views of two complementary masking elements which are adjusted relative to each other in the calibration of the instrument and which move as a unit in the normal operation of the structure to vary the relative outputs of the two cells, Fig. 6 is a sectional view of the dome member which serves as a housing for the photocell-mask assembly, with the respective photocell—filter—mask elements of Figs. 1–4 in exploded relation to the dome, Figs. 7, 8, and 9 illustrate the adjustable masks of Figs. 4 and 5 in various relative orientations, and Fig. 10 illustrates diagrammatically the circuit and calibrating arrangement employed in adjusting the masks.

Generally, the invention is practiced by employing a multiple spiral photocell unit of the type described more particularly in the copending application of Clement F. Taylor, John F. Weary, and Walton E. Briggs, Serial Number 271,746, filed February 15, 1952, issued on February 2, 1954, as U. S. Patent No. 2,668,184, and assigned to the same assignee as the present application, in combination with a plurality of masking disks which overlie the photocells and are adjusted in calibration of the unit, certain of the masks being rotatable in normal operation to very the relative output of the cells.

Referring now more particularly to the drawings, Fig. 6 shows an exploded assembly view, in section, of the elements which comprise the combination. This includes the multiple photocell unit 1, a pair of complementary spiral color filters 2a, 2b, a pair of auxiliary masking disks 3a, 3b, and an adjustable mask 4 secured in a rotatable dome member 5. Preferably the filters 2a and 2b are identical as to shape, but displaced by 180 degrees in angular position relative to each other, so that each of the two spiral filters occupies the space between the convolutions of the other, thus forming a substantially circular area having complementary spiral portions of respectively different colors.

As described more completely in the above-mentioned application of Taylor, Weary, and Briggs, the multiple photocell 1 comprises two complementary spiral backplates identified 1a, 1b in Fig. 6 having a surface coating of crystalline selenium 1c and bonded together into an integral mechanical unit by amorphous selenium 1d filling the gaps between the complementary spiral backplates. The surface coating of photosensitive crystalline selenium is covered by a transparent conductive layer identified 1e in Fig. 6, to which may be applied a coating of protective lacquer 1f. The photosensitive surfaces of the respective spiral cells are electrically separated from each other by a spiral incision shown at 1g in Fig. 1. Applied to the top surface of the conductive layer 1e in electrical conducting relation therewith, is a network of spiral "collector strips" shown at 1h in Fig. 1 (but not shown in Fig. 6, because of the small scale thereof). It will be seen that these collector strips extend the entire length of the spiral cells and are so disposed in plan view that all parts of the photosensitive surface are very close to and have direct access to these low resistance collector strips. The outer convolutions of the respective spirals are provided with conductive terminal portions 1k, 1m, these terminals being in electrical conducting relation with, and preferably formed integral with collector strips 1h. These collector strips and terminal portions may be conveniently formed by spraying a metal such as cadmium, with suitable masking arrangements. It will be seen in Fig. 1 that in the assembled condition the outer perimeter of the photocell unit is generally circular, being interrupted by two diametrically spaced notches 1n, defined between complementary radially disposed "steps"

in the outer convolution of the respective spiral cells. These notches are intended to receive connector clips adapted to engage the terminal portions 1k, 1m of the collector strips and serve as the connecting means to the external circuit (not shown).

Fig. 2 represents the shape of the complementary spiral color filters shown at 2a, 2b in Fig. 6. By comparison of Figs. 1 and 2, it will be apparent that the spiral filter is the same shape as and adapted to overlie the spiral photocell. These filters may be conveniently cut from gelatin or other plastic or glass filter material commercially available for photographic and other optical purposes. The color filters 2a, 2b are so selected as to transmit light of dominant wavelength in spaced portions of the spectrum. For measurement of "equivalent color temperature," it is found most convenient to use one filter transmitting light mostly at the blue end of the spectrum while the other transmits essentially red light. More specifically, the red filter may be of the type known commercially as "Wratten #22" or "#23." The blue filter may be similar to that known as "Wratten #80." The density of the two filters must be appropriately selected; and it presently appears that two thicknesses of the standard Wratten #80 material are required, with only one thickness of the Wratten #22 filter. In large scale production, it may be more convenient to have special filter sheet material manufactured of exactly the proper density.

In selecting the appropriate filter materials, it is first necessary to decide the arcuate length of the scale to be used (about 110° in the present case) and the range of color temperatures to be covered (2,000° K. to 30,000° K.). Then the shape and disposition of the masking spots is laid out to correspond with the scale length, and the filters are selected corresponding to the portion of the spectrum to be covered. The filter and mask combination described specifically herein seems to give the optimum accuracy, stability, linearity and uniformity of scale distribution.

Fig. 2a illustrates the approximate light transmission characteristics of the red and blue filters. It is of particular importance to note that the transmittance of these filters exhibits an overlapping characteristic. That is, the blue filter transmits the greatest percentage of the radiation in the range from 400 to 500 millimicrons, but also may transmit a decreasing amount of radiation in the rest of the spectrum. Likewise, the red filter transmits mostly in the range from 600 to 700 millimicrons wavelength, but also may transmit a decreasing amount of radiation in the remainder of the spectrum. It has been found that such overlapping characteristics are desirable if the complementary pair of photocells is to give a smoothly continuous and accurate reading of equivalent color temperature.

As will be seen in Fig. 2, the outer convolution of each filter is cut away, as shown at 2c, in order that the filter material, which is an electrical insulator, will not cover the terminal portion 1k of the red sensitive cell and the terminal portion 1m of the blue sensitive cell. On the other hand, the extreme outer end portion 2d of the filter material is arranged to cover and electrically insulate the terminal portions 1p of the extreme ends of the collector strips 1h. This is so the connector terminal clips (not shown) may make electrical contact with the terminal portions 1k, 1m respectively, but will not make electrical contact with the collector strip terminal portions 1p. These filters are suitably secured to the surface of the respective spiral photocells, as by one or small spots of transparent plastic cement.

The plan shape of the auxiliary masks 3a, 3b is shown in Fig. 3. Each of these masks comprises a disk of transparent sheet plastic material having an arcuate circumferential portion 3c carrying an irregularly shaped opaque spot 3d, which may be conveniently applied by spraying black paint, with a suitable stencil. It will be observed that the inner and outer boundaries of this spot are circular arcs, while the "forward" edge 3e and the "rearward" edge 3f are straight lines forming an acute angle with radial elements. The significance of this configuration will appear hereinafter in the description of the method of calibrating the photocell.

The plan shape of the adjustable masking disk 4 is shown in Fig. 4. This disk is adapted to be rotatably secured to the undersurface of dome 5 by a hollow rivet 5a pressed into the dome 5 as shown in Fig. 6. After the calibration process described hereinafter, this adjustable disk is fixed to dome 5, as by one or more spots of transparent plastic cement, so that in normal operation the dome 5 and masking disk 4 will rotate together. It may also be noted that the photocell unit 1, complementary filters 2, auxiliary masks 3, and the hollow rivet 5a all define cooperating central recesses, which are adapted to receive a cylindrical post (not shown) which projects from the meter housing to maintain the photocell, masks, and dome in proper concentric relation.

The dome 5 itself is made of a translucent light transmitting material, such as an "opal" grade of the plastic material known to the trade as "Lucite." It will be obvious that a suitable glass or other plastics, may also be used, just so long as they have satisfactory light transmission characteristics for the components of the illumination to which the photocells are intended to be sensitive. The circumference of dome 5 is provided with integral gear teeth 5b, which serve as convenient finger grips for the operator in adjusting the dome relative to the photocell 1, and may also serve to drive a calculator dial (not shown) by a movement-multiplying pinion, as described more particularly in the copending application of Stimson, Taylor, and Bakke, hereinbefore identified.

The dome 5 carries a plurality of opaque areas or "masking spots," the plan shape of which is shown in Fig. 5. These variously shaped opaque spots may be conveniently applied by spraying black paint on the undersurface of the dome, with a suitable stencil. The geometrical characteristics of these masking spots are as follows.

Attention is first directed to the largest spot 5c. The outer boundary of this spot is a circular arc, of a radius equal to that of the outer boundary 3h of the auxiliary mask spot 3d. The front and rear edges 7, 8 of the spot are straight lines disposed at an angle to radial elements (as noted above in connection with elements 3e, 3f of the auxiliary mask spot 3d). The inner circumference of spot 5c follows generally a circular arc, but has an irregular "sawtooth" configuration for reasons explained hereinafter. It is to be particularly observed that the circumferential extent of the spot 5c is sufficient that the auxiliary masking spots 3d may be shifted circumferentially an amount required to calibrate the photocells at two intermediate points in the color temperature scale (as will appear from the method of calibration described hereinafter) without the auxiliary spots 3d passing out from under the spot 5c.

The masking spots on the undersurface of dome 5 also include a spirally disposed set of similarly shaped polygonal spots 5d and an outer series of three spots 5e. It is a common characteristic of all the spots 5d, 5e that they have no boundaries which lie either in an exactly radial direction or parallel to the smooth spiral curve of the incised groove 1g separating the photocells. More specifically, the "leading edges" 10 and the "trailing edges" 11 of spots 5e are disposed at an acute angle to radial lines as noted above in connection with the edges 3e, 3f of the auxiliary mask spot 3d. Likewise, the inner edges of the spots 5e are defined by straight lines 12, 13 both of which define an acute angle with the smooth spiral curves representing the shape of the edges of the photocells and the collector strips 1h.

The inner set of spirally disposed spots 5d have leading edges 14 in the shape of sharp "prows" defined by straight lines which are neither radial nor tangent to the smooth spiral curves of the photocells and collector strips. Also, the "prow" 14 of each spot 5d is similar in shape to the reentrant "stern" 15 of the next adjacent spot. In other words, if one spot 5d were moved circumferentially, it will be found that the pointed prow 14 just matches the reentrant stern 15. This is generally true of all the spots 5d.

The basis for the arrangement of the spots on the dome 5 will be appreciated further from the following description of the masking spots on the adjustable disk 4 and the manner in which they cooperate with the dome mask spots. The disk 4 has three outer circumferential spots 4a which are generally similar in shape to the spots 5e on the dome. Similarly, the inner spirally disposed set of spots 4b are generally similar to the spiral set 5d in Fig. 5, but there is no large spot on disk 4 corresponding to spot 5c on the dome.

The logic behind the precise location and shape of these masking spots will be appreciated better from a consideration of Figs. 7, 8, and 9, which illustrate the adjustable mask 4 in various positions relative to the dome 5.

Fig. 7 illustrates the "maximum masking" position. It will be seen that the radially outer sets of spots 4a, 5e cooperate to form a continuous spot extending circumferentially a distance roughly equal to that subtended by the spot 5c on the dome, and defining an inner circumferential boundary of a generally sawtooth configuration similar to the inner boundary 9 of the spot 5c. Likewise, the inner spirally disposed sets of spots 4b, 5d cooperate to define a continuous spiral masking area connecting with one end of the large spot 5c and having both inner and outer boundaries of sawtooth configuration. An important criterion for the shape and disposition of the masking spots is that, when in the "maximum masking" position shown in Fig. 7, the dome 5, with the disk 4 fixed to it, can be rotated relative to the photocells to a position in which all of the masking spots are contained substantially within the outlines of one of the spiral photocells. To illustrate this, the outlines of the two complementary spiral photocells are indicated in dotted lines in Fig. 7.

It will be observed that there is one major and one minor exception to the above statement that the masking spots can all be inscribed within the outlines of one cell. The major exception is the circumferential portion of the large spot 5c identified 16 in Fig. 7 which overlies the other photocell 1b. The minor exception relates to the fact that the smooth spiral representing the incised groove between the photocells passes along the "mean pitch line" of the sawteeth defining the inner circumferential boundary of the large spot 5c and the sawtooth inner boundary of the cooperating spots 5e, 4a.

The "minimum masking position" is illustrated in Fig. 8. Here again it will be observed that the spiral pattern of the masking spots can be oriented so as to lie substantially within the outlines of one photocell, but with the portion 16 of the spot 5c again overlying the other cell. Because of the difficulty of shaping the spots so that they will match exactly in both "minimum" and "maximum" masking positions, it is inevitable that there will be some small discrepancy in this matter, as shown in Fig. 8. It will also be seen in Fig. 8 that the sawtooth inner boundaries of the spots again cross the spiral line dividing the cells.

It will be now understood that, as the adjustable mask 4 moves from the maximum masking position of Fig. 7 to the minimum masking position of Fig. 8, an increasing area of the photosensitive surface of the cells is exposed to light passing through the dome 5. One such intermediate position is shown in Fig. 9. Not only does the aggregate cell area exposed to the light increase, but the increase takes place all along the length of the spiral cell, since there is an increasing area exposed between each adjacent pair of relatively moving spots. Thus the change in effective cell area does not occur entirely at the inner end or at the outer end of the cell. This is important if the unit is to have the desired response regardless of the direction from which the illumination falls on the meter, and for all positions of adjustment of the calibrating masks.

It will also be observed that the instrument will produce the maximum scale reading possible when the cooperating masking members 4, 5 are in the maximum masking position and the dome is oriented so that the masking spots cover a maximum area of one cell and a minimum area of the other, as shown in Fig. 7. Adjusting the masking members 4, 5 to an intermediate position as shown in Fig. 8 will have the effect of shortening the maximum possible range of the instrument.

It will now be seen that a primary design criterion in selecting the pattern for the masking spots is that, when in the maximum masking position, the spots cover the maximum area of the masked cell and make possible the maximum range of variation in the exposed cell area. The size of the auxiliary masking spots 3d is made as large as feasible without having these auxiliary spots uncovered by the large spot 5c during calibration of the two intermediate points, as described hereinafter.

The reasons for the irregular shape of the masking spots are as follows.

When producing photosensitive selenium cells by mass production methods, it is inevitable that there will be inequalities in the degree of photosensitivity of various portions of the selenium surface. These areas of differing degrees of photosensitivity may be of random shape. The response of the instrument, as the dome moves with mask 4 fixed relative to the dome, would not be a smooth continuous function of rotational displacement of the dome relative to the photocell if the "leading" and "trailing" edges of the masking spots should suddenly cross the boundary of one of these areas of differing photosensitivity. Therefore, the inclination of the radial edges 3e, 3f of the auxiliary masking spot 3d, the edges 7, 8 of the spot 5c, the edges 10, 11 of the spot 5e, and the corresponding sides 10a, 11a, of the spots 4a insures that the transition of the masking spots from an area of one degree of photosensitivity to an area of a differing degree of sensitivity will be gradual with respect to the over-all effect of the masks.

Another important discontinuity in the response of the system would occur if the masking spots cooperated to define a smooth curve having portions substantially parallel to the spiral incision 1g and collector strips 1h. In that case, there would be various positions of the dome relative to the photocell in which the smoothly curved radially inner and outer sides of the spots more or less match the curvature of the incision and collector strip over a substantial arc thereof. This would mean that, for a substantial degree of movement of the dome, there would not be a proportionate change in the area of photosensitive surface exposed. The sawtooth configuration of the inner circumference 9 of the spot 5c, and the similar sawtooth configurations of the sides of the spiral masks defined by spots 4b, 5d, and 4a, 5e, respectively (as illustrated in Fig. 7) insures that, when the masked dome rotates relative to the photocell, the opaque masking areas will gradually cover the inactive area of the photocell represented by the collector strips and incision separating the cells.

In other words, the shape of the masking spots is carefully selected, by something of a trial and error process, but guided by definite design criteria, so that the active surface of the photosensitive cells, taking into consideration the shape and size of the inactive areas represented by the spiral incisions and by the collector strips and their terminal portions, will smoothly and continuously change as the dome rotates relative to the photocell unit, the irregular shape of the leading and trailing edges of the spots also helping to eliminate discontinuities in cell output due to inequalities in the sensitivity of the photosensitive surface. It will of course be appreciated that masking spots of other geometric shapes may be capable of producing similar results. For instance, the outlines of the spots could be smoothly curved, but retaining the general shape shown in Figs. 4, 5 and otherwise complying with the design criteria outlined above.

As described in more detail in the copending application of Stimson, Taylor, and Bakke hereinbefore identified, the function of the dome and the masking disk 4 carried by it is to progressively alter the ratio of the exposed area of the red-filtered photocell to the exposed area of the blue-filtered photocell. It will be apparent in Fig. 7 that a maximum area of the "blue" cell 1b is exposed, and only a very small portion of the "red" cell 1a is left uncovered by the cooperating masking spots. If then the dome 5 rotates clockwise relative to the photocells, it will be obvious that the large spot 5c will cover an increasing portion of the blue cell 1b, while the outer set of spots 4a, 5e progressively uncover the extreme end portion of the red cell 1a. Equally important is the fact that, during this rotation, the sawtooth outer perimeter of the spots 4b, 5d has been progressively "cutting into" the area over the blue cell while the sawtooth inner perimeter of spots 4b, 5d, and of the spots 4a, 5e, have been progressively leaving the red cell area, and the sawtooth edge 9 of spot 5c leaves the blue cell and uncovers the red cell.

This action can be more fully appreciated by making transparent patterns of the masking elements shown in Figs. 4 and 5, superimposing them on a plan view of the photocell as shown in Fig. 1, and observing the effect as the masks rotate relative to the photocell. If this is done, it becomes readily apparent how masks patterned as disclosed herein effect a very gradual change in the ratio of the "active" portions of the red and blue cells, this change in the cell area masked occurring smoothly over the entire length of the spiral cells. Thus for all positions of the rotatable masked dome, the photocells present a pair of complementary spiral active surface portions.

Another important advantage of this masking arrangement is that a very substantial degree of rotational movement of the dome produces a comparatively small change in the area ratio. This makes it possible to provide the instrument with a comparatively long, easily read scale.

Having described the general structure of the various masking elements and the general method of operation of the completed assembly, the details of the process for determining the proper orientation for the masks, in order to make the characteristics of an individual photocell combination fit a preselected fixed scale on the instrument, will now be described.

First, it is assumed that the photocell unit 1 has been assembled completely, with the red and blue filters secured in place and the cells connected in the circuit with the indicating instrument as described in the co-pending application of Stimson, Taylor, and Bakke hereinbefore identified. These circuit connections are indicated very diagrammatically in Fig. 10, the two photocells being shown at 19, 20, connected in series by conductors 21, 22, with the null type microammeter 24 connected in series with both cells by conductor 23. It is also assumed that a "calibration scale" suitably marked, as for instance in degrees Kelvin, is secured temporarily to the meter so that the circumferential positioning of the dome can be related to this scale. This shop calibration scale may take the form of a plate 17 adapted to slip over the dome and be secured, as by adhesive tape, to the case of the meter during the calibration process. This scale may be graduated in degrees Kelvin as shown in Fig. 10, and may for instance extend from about 2000° K. to 30,000° K. The scale plate 17 is of course arranged so that dome 5 can be readily installed and removed during the calibration process. It will of course be appreciated that the graduations on the shop scale 17 correspond to those on the calculator dial mounted on the back of the meter (not shown) and geared to move with the dome as described more particularly in the copending application of Stimson, Taylor and Bakke hereinbefore identified.

The first step is to calibrate two intermediate points on the scale, for instance those corresponding to 3,000 and 6,000° Kelvin. These points are particularly important to photographers, since ordinary incandescent "tungsten" light is in the neighborhood of 3,000° K., while natural middle-of-the-day sunlight is on the order of 6,000° K.

To effect calibration at these intermediate points, the two auxiliary masking disks 3 are oriented so that the black spots 3d coincide and lie beneath the large spot 5c on the dome. Here it may be noted that the principal function of the large spot 5c is to thus hide the auxiliary mask spots 3d during the calibration process. The spot portion identified 16 in Fig. 7 and Fig. 8 is necessary in order that the auxiliary mask spots 3d will not appear from beneath the spot 5c at any time during the calibration process.

It is to be noted that the translucent dome 5 is made of material having excellent light diffusing qualities, and that the dome will be spaced from the photo-sensitive surface of the cells due to the interposition of the filters and masks. This separation between dome and cells may be on the order of .075 inch. The light-diffusing action of the dome and the close spacing between masks and cells has a significant beneficial effect in rendering the instrument insensitive to direction and angle of incidence of the illumination. The adjustable dome mask 4 is oriented relative to the masking spots painted on the dome itself to a position roughly intermediate the maximum masking position of Fig. 7 and the minimum masking position of Fig. 8. This may for instance be roughly represented by the intermediate position shown in Fig. 9. Disk 4 is then temporarily secured to the dome, as by a piece of adhesive tape. The auxiliary masking disks 3 are then likewise secured temporarily to the dome with adhesive tape, with the spots 3d superimposed and lying beneath the large spot 5c.

The dome is now assembled to the photocell and illuminated with light at 3,000° K., provided by a suitable calibrated standard lamp, and adjusted circumferentially until the needle of the "null type" instrument 24 is at the zero mark. A temporary fiducial mark is now applied to the dome at the 3,000° mark on scale 18. This mark may be conveniently provided by a small triangle of transparent cellulose adhesive tape shown at 25.

The illumination is now changed to 6,000° K., as for instance by covering the light source with a suitable standard filter adapted to pass only light of this quality. The dome is now rotated clockwise until the instrument 24 again reads zero. It is now noted whether the fiducial mark 25 is exactly at the 6,000° mark on the scale 18. Due to differences in the characteristics of individual photocells, as well as differences in the domes, filters, and masks, made by mass production methods, this will rarely occur. Assume first that the mark 25 is short of the 6,000° mark, as indicated in dotted lines at 25a in Fig. 10. This means that the masking effect of the disk 4 is too "heavy." Brief consideration of the effect of the masks will show that the greater the degree of maskings the shorter will be the scale of the instrument. Therefore the dome must be removed and disk 4 adjusted relative to the mask painted on dome 5 so that the relatively movable spots shift towards each other to reduce the effective mask area. Disk 4 is again secured to the dome with adhesive tape and the preceding sequence of tests is repeated.

Similarly, if the scale of the instrument initially should be too long, the fiducial mark 25 falling at the dotted line position 25b, the mask 4 must be rotated so as to increase the masking effect in order to shorten the scale of the instrument. When disk 4 is properly adjusted, the fiducial mark 25 will fall exactly at the 3,000° mark when illuminated by light of that quality, and at the 6,000° mark as shown at 25c in Fig. 10 when so illuminated.

Thus by a simple trial and error process the adjustable dome mask 4 will render the meter accurate at two important intermediate points on the scale. Disk 4 may now be permanently secured to the dome, as for instance by lifting the edge of the disk and applying one or more small spots of transparent plastic cement between disk and dome.

The second major step is to "trim" the ends of the scale so that the fiducial mark 25 will "track" properly at the minimum and maxium readings of the instrument. To do this the color quality of the standard lamp illuminating the photocell is changed to some minimum value, for instance on the order of 2360° K., as for instance by reducing the voltage on the lamp, and the dome is again rotated until instrument 24 reads zero. Now, with disks 3a and 3b positioned so spots 3d are coincident and disposed over one of the notches 1n, it is noted whether the fiducial mark 25 is at the 2360° mark on the scale, or within some preselected margin of allowable error. At present is is believed that for photographic purposes this allowable margin may be plus or minus 150° K. If the mark 25 is within this margin, auxiliary masking disk 3a is permanently cemented to the photocell unit 1 in its present position. Then any subsequent adjustment of mask 3b will not affect the calibration of the meter at the three points already checked, namely 2,360° K., 3,000° K., and 6,000° K.

However, if, as may be the case, the mark 25 is not within the allowable range, auxiliary mask 3a is adjusted until the fiducial mark 25 does read properly when illuminated with 2360° K. light. This again is a trial and error process; but it may be noted that if the scale reading is too low the auxiliary masking spot is adjusted so as to cover a portion of the red photocell in the exposed region just ahead of the leading edge 7 (Fig. 5).

After the proper position for the auxiliary mask 3a is determined, it is secured to the photocell 1, as by a drop of transparent cement.

It remains to trim the "high" end of the scale. This is done by changing the quality of the illumination to a relatively high value, say 10,000° K., as by the use of standard filters and appropriate regulation of the voltage applied to the test lamp. The dome is again rotated until instrument 24 reads zero, whereupon a check is made to see whether fiducial mark 25 tracks the scale 18 within allowable limits of error at the high end of the scale. For most purposes it will be adequate to calibrate the scale at a reading on the order of 10,000° K., since higher values will be used infrequently and the meter will read with sufficient accuracy above 10,000° K. if it within allowable limits at 10,000. At the high end of the scale, the allowable tolerance may be plus or minus 1,000°. If the reading is not within these limits, the other auxiliary mask 3b is adjusted, with its spot 3d covering a portion of the exposed area at leading edge 8 of spot 5c (Fig. 5) until a proper reading is obtained. The mask 3b is then cemented to the photocell unit.

The meter now reads accurately at four important and widely spaced locations on the scale.

Thus it will be seen that a multiple masking arrangement in accordance with the invention provides ready means for accurately adjusting the output of a multiple photocell unit so that individual meters will read accurately on a preselected fixed scale provided on the meter in spite of rather wide variations in the characteristics of individual photocells and other components. At the same time, the complicated masking arrangement required is very carefully arranged so the meter will give a continuous change in indicated color temperature value as a function of rotational displacement of the dome, there being no portions of the range of movement of the dome which will not be accompanied by a proportional change in output of the photocells. Equally important is the fact that, for all adjusted positions of the multiple masks, the change in the area masked will be substantially continuous along the full length of the spiral photocells. Thus the meter remains insensitive to direction of approach of the illumination regardless of the orientation of the calibrating masks, and the scale distribution has no discontinuities.

While only one specific form of the invention has been described particularly, it will be obvious that numerous changes in structure and substitution of mechanical equivalents may be made. The irregular spots on the respective masks need not be completely opaque, so long as they reduce the quantity of light reaching the cells. Also, the precise shape of the masking spots may be widely varied, so long as the design criteria mentioned herein are observed. One color filter may be eliminated, so that one cell responds to the entire spectrum while the other filtered cell responds to only a preselected part of the spectrum. The mechanical structure of the respective adjustable masking devices could of course take many equivalent forms, as could the design of the dome and the indicator scale used with it. While the invention has been described as applied to a multiple photocell unit having only two separate photocells, it is obviously applicable to units having three or more nested cells.

It is of course intended to cover by the appended claims all such changes and substitution of equivalents as fall within the true spirit and scope of the invention.

What I claim as new and desire to secure by Letters Patent of the United States is:

1. A multiple photocell structure comprising at least two separate photocells of complementary spiral configuration each being disposed within the spiral space defined between the other's adjacent convolutions, the perimeter of the multiple photocell unit having a generally circular configuration, and a pair of masking members disposed in superposed relation to the photocells, each of said masking members being of light-transmitting material and having a plurality of discrete light blocking spots of irregular shape, said spots on each mask being spaced along a spiral path conforming to the spiral configuration of said photocells, said masks being rotatable relative to one another whereby in one position the spots of one mask substantially cover the light transmitting areas between the spots of the other mask to form a composite opaque spiral path conforming to the spiral configuration of one of said photocells and whereby in another position the spots of one mask substantially coincide with the spots of the other mask to form a composite partly opaque spiral path conforming to the spiral configuration of one of the photocells, said masking members being bodily rotatable with respect to said photocells and said spots being so shaped that said composite path progressively covers and uncovers portions of adjacent photocells upon occurrence of said bodily rotation.

2. A multiple masked photocell structure in accordance with claim 1 in which the spots on the masking members are of irregular generally polygonal shape having some boundaries disposed to form acute angles with respect to mask radii and having some boundaries disposed to form acute angles with respect to the curves bounding active photocell areas but having no boundaries which are exactly radial and no boundaries generally parallel to the curves bounding active photocell areas whereby upon bodily rotation of the masking means the spots will cover gradually adjacent portions of the spiral separating line between cells.

3. A multiple photocell structure comprising at least two separate photocells of complementary spiral configuration each being disposed within the spiral space defined between the others adjacent convolutions, the perimeter of the multiple photocell unit having a generally circular configuration, and a plurality of light-passing members with masking areas in superposed relation to the photocells, at least two of said masking members having a plurality of discrete light blocking spots of irregular shape, said spots on each mask being spaced along a spiral path conforming to the spiral configuration of said photocells, said masks being rotatable relative to one another whereby in one position the spots of one mask substantially cover the light transmitting areas between the spots of the other mask to form a composite opaque spiral path conforming to the spiral configuration of one of said photocells and whereby in another position the spots of one mask substantially coincide with the spots of the other mask to form a composite partly opaque spiral path conforming to the spiral configuration of one of the photocells, said masking members being bodily rotatable with respect to said photocells and said spots being so shaped that said composite path progressively covers and uncovers portions of adjacent photocells upon occurrence of said bodily rotation.

4. A multiple photocell structure comprising at least two photocells of complementary spiral configuration each disposed within the spiral space defined between the other adjacent convolutions with the perimeter of the photocell unit having a generally circular configuration, and a pair of masking members disposed in superposed relation to the photocells, each one of said masking members being of light-transmitting material and having a plurality of discrete relatively opaque spots of irregular shape, the spots on each of said two masks being spaced along a spiral path conforming to the spiral shape of the photocells, said masks being rotatable relative to one another whereby in one position the spirally disposed spots of one mask complement the spots of the other mask to provide a substantially opaque area of generally spiral configuration matching the shape of a spiral photocell and whereby in another position the spots of one mask are in substantially superposed relation with spots of the other mask, the rotation of the masking members relative to each other operating to vary the aggregate mask area of said masking members along the length of the spiral area covered by said spots, said masking members being bodily rotatable with respect to said photocells so that the ratio between the unmasked areas of the respective photocells may be progressively altered, said change in uncovered area ratio occurring along substantially the entire length of the spiral cells.

5. A photocell structure comprising at least one spiral photocell with each convolution thereof spaced radially from adjacent convolutions to define a spiral space between convolutions and a pair of masking members disposed in superposed relation to the photocell, each of said masking members being of light-transmitting material and having a plurality of discrete light-blocking spots of irregular shape, said spots on each mask being spaced along a spiral path conforming to the spiral configuration of said photocell, said masks being rotatable relative to one another whereby in one position the spots of one mask complement those of the other mask to provide a substantially continuous masking path of generally spiral configuration substantially matching the shape of the spiral photocell and whereby in another position the spots of one mask are substantially superposed relative to spots of the other mask, the relative rotation of the masking members serving to alter the aggregate mask photocell area, said masking members being bodily rotatable with respect to said photocell such that motion thereof will progressively alter the uncovered area of the photocell substantially along the spiral length thereof.

6. A mask member for use over a photocell having at least one cell of spiral configuration with each convolution thereof spaced radially from adjacent convolutions to define a spiral space substantially similar in shape and size to the photocell, the outer periphery of the cell being of generally circular configuration, said mask comprising a pair of relatively rotatable light-transmitting members, each member having a plurality of discrete relatively opaque spots spaced along a spiral path corresponding to the shape of the photocell, said spots being of irregular outline and having forward and rearward edges inclined to radial elements and having other boundaries inclined to the curves bounding the active photocell area but having no portions of substantially circumferential extent disposed parallel to a curved boundary of active surface of the photocell for all orientations of the mask relative to the cell.

7. A mask member in accordance with claim 6 in which the pair of light-transmitting members can be rotated to one position such that the spots of one member substantially cover the light-transmitting areas between the spots of the other member to form a composite substantially continuous opaque spiral path conforming to the spiral configuration of the cell and the members can be rotated to another position in which the spots of one mask substantially coincide with the spots of the other mask to form a composite discontinuous relatively opaque spiral path conforming to the spiral configuration of the cell.

8. A multiple photocell structure comprising two photocells of complementary spiral configuration each being disposed within the spiral space defined between adjacent convolutions of the other, the perimeter of the photocell unit having a generally circular configuration, one of said photocells being primarily sensitive to red light and the other photocell being primarily sensitive to blue light, and a pair of masking members disposed in superposed relation substantially adjacent to the photocells, said masking members including a first dome member of translucent light-diffusing material and defining a plurality of discrete relatively opaque areas spaced along a spiral path conforming substantially to the plan shape of one of the photocells, a second masking disk member of light-transmitting material adapted to be rotatably adjusted relative to the dome and having a complementary set of relatively opaque areas of such size and location that, in one position relative to the dome, the opaque areas of dome and disk cooperate to provide a composite masking area of generally spiral configuration substantially matching the shape of the spiral photocell, and upon rotational displacement of said disk relative to the dome away from said one position the composite masked area progressively decreases, said dome and disk being bodily rotatable with respect to the photocells whereby a smoothly progressing alteration in the ratio of the unmasked effective area of the respective photocells results upon rotation.

9. A multiple masked photocell structure comprising two photocells of complementary spiral configuration each disposed within the spiral space defined between adjacent convolutions of the other, the perimeter of the photocell unit having a generally circular configuration, first color filter means of spiral configuration disposed over one photocell and adapted to transmit red light, second color filter means of spiral configuration disposed over the other photocell and adapted to transmit blue light, and a pair of generally circular masking members disposed in superposed relation substantially adjacent to the color filters, one of said members being a dome member of translucent light-diffusing material spaced away from the color filters and having a plurality of discrete relatively opaque masking areas spaced along a spiral path conforming substantially to the plan shape of one of the spiral photocells, another of said members being a disk member of light-transmitting material rotatably mounted on the dome in adjustable relation therewith and having a complementary set of relatively opaque areas spaced along a spiral path so that, in one position relative to the dome, the masking areas of dome and disk cooperate to provide a large mask area of generally spiral configuration and substantially matching the shape of one of the spiral photocells while rotational displacement of the disk from said one position progressively decreases the aggregate masked area, said dome and mask being rotatable together relative to the photocells to effect a smoothing progressing alteration in the ratio of unmasked effective area of the respective cells, and at least one auxiliary masking disk disposed between the photocells and the dome and having a relatively opaque masking area of limited circumferential extent near the outer periphery thereof and adapted to be secured relative to the photocell, said auxiliary mask being rotatably adjustable relative to the photocell to produce a masking effect on the relative outputs of the photocells.

10. A multiple masked photocell structure in accordance with claim 9 in which one of the complementary pair of masking members has a large opaque spot of substantial circumferential extent near the periphery thereof and of such shape and size as to overlie the masking spot of said auxiliary masking disk during adjustment of the dome mask members in the calibration process, the inner circumferential boundary of the large spot being of sawtooth configuration along a generally spiral path whereby the inner edge portion of the spot will gradually cross the spiral edges of the photocells.

11. A photocell structure comprising at least one spiral photocell with each convolution thereof spaced radially from adjacent convolutions to define a spiral space between convolutions, and masking means disposed in superposed relation to the photocell, said masking means including a member formed of a light-transmitting material, said member carrying a plurality of light-blocking spots of irregular shape arranged along a spiral path to form a masking path corresponding to the shape of the spiral photocell, said spots being adjustably positioned along said path to vary the spacing therebetween whereby the total area of said masking path may be varied between maximum and minimum values, said masking member being rotatably mounted relative to said photocell such that motion thereof will progressively alter the unmasked area of the photocell substantially along the spiral length thereof.

References Cited in the file of this patent
UNITED STATES PATENTS

| | | |
|---|---|---|
| 2,089,830 | Grondahl et al. | Aug. 10, 1937 |
| 2,217,326 | Wald | Oct. 8, 1940 |
| 2,247,805 | Faus | July 1, 1941 |
| 2,319,212 | Cooley | May 18, 1943 |
| 2,353,475 | Kinnard | July 11, 1944 |
| 2,462,823 | Woodward | Feb. 22, 1949 |
| 2,466,021 | Goldmark | Apr. 5, 1949 |
| 2,478,598 | Somers | Aug. 9, 1949 |
| 2,503,768 | Rizdorfer | Apr. 1, 1950 |
| 2,520,138 | Frink | Aug. 29, 1950 |
| 2,579,347 | Taylor | Dec. 18, 1951 |
| 2,587,601 | Crandell et al. | Mar. 4, 1952 |
| 2,668,184 | Taylor et al | Feb. 2, 1954 |

FOREIGN PATENTS

| | | |
|---|---|---|
| 812,723 | France | Sept. 3, 1951 |
| 925,985 | France | Apr. 14, 1947 |